(12) United States Patent
Arora (10) Patent No.: US 9,204,200 B2
(45) Date of Patent: Dec. 1, 2015

(54) ELECTRONIC PROGRAMMING GUIDE (EPG) AFFINITY CLUSTERS

(75) Inventor: Gagan Arora, Menlo Park, CA (US)

(73) Assignee: Rovi Technologies Corporation, Santa Clara, CA (US)

( * ) Notice: Subject to any disclaimer, the term of this patent is extended or adjusted under 35 U.S.C. 154(b) by 105 days.

(21) Appl. No.: 12/978,100

(22) Filed: Dec. 23, 2010

(65) Prior Publication Data

US 2012/0167141 A1 Jun. 28, 2012

(51) Int. Cl.
| | |
|---|---|
| G06F 3/00 | (2006.01) |
| G06F 13/00 | (2006.01) |
| H04N 5/445 | (2011.01) |
| H04N 21/482 | (2011.01) |
| H04N 21/81 | (2011.01) |

(52) U.S. Cl.
CPC ....... *H04N 21/4826* (2013.01); *H04N 21/8133* (2013.01)

(58) Field of Classification Search
USPC ......................................... 725/38–40, 46, 58
See application file for complete search history.

(56) References Cited

U.S. PATENT DOCUMENTS

| | | | |
|---|---|---|---|
| 7,188,355 B1 * | 3/2007 | Prokopenko et al. ........... | 725/46 |
| 7,630,966 B2 * | 12/2009 | Arora ..................................... | 1/1 |
| 7,750,909 B2 | 7/2010 | Purang et al. | |
| 8,015,580 B2 * | 9/2011 | Poling et al. ..................... | 725/39 |
| 8,171,508 B2 * | 5/2012 | Beaunoir et al. ................. | 725/27 |
| 2003/0037339 A1 * | 2/2003 | Lee ............................... | 725/109 |
| 2003/0101451 A1 | 5/2003 | Bentolila et al. | |
| 2003/0101454 A1 * | 5/2003 | Ozer et al. ....................... | 725/42 |
| 2003/0126600 A1 * | 7/2003 | Heuvelman ...................... | 725/35 |
| 2003/0131355 A1 * | 7/2003 | Berenson et al. ................ | 725/46 |
| 2003/0135855 A1 * | 7/2003 | Faihe ............................... | 725/46 |
| 2004/0117829 A1 * | 6/2004 | Karaoguz et al. ............... | 725/46 |
| 2004/0268403 A1 * | 12/2004 | Krieger et al. .................. | 725/112 |

(Continued)

FOREIGN PATENT DOCUMENTS

| | | |
|---|---|---|
| CN | 101044484 | 5/2010 |
| CN | 101803371 | 8/2010 |
| WO | 0201419 A1 | 1/2002 |

OTHER PUBLICATIONS

Banerjee, et al., "Multi-way Clustering on Relation Graphs", Retrieved at <<http://citeseerx.ist.psu.edu/viewdoc/download-?doi=10.1.1.100.6296&rep=rep1&type=pdf >>, Proceedings of the SIAM International Conference on Data Mining, (SDM), Apr. 2007, pp. 12.

(Continued)

*Primary Examiner* — Mulugeta Mengesha
(74) *Attorney, Agent, or Firm* — Ropes & Gray LLP (57) ABSTRACT

Techniques are described in which electronic program guide (EPG) affinity clusters may be formed based upon an assumption that programs scheduled in corresponding timeslots are targeted to the same or similar audiences. In at least some embodiments, data for an EPG is examined to identify programs that are scheduled in timeslots designated as corresponding. Metadata related to the identified programs is collected. The metadata may include titles as well as cast/crew data related to the programs. One or more affinity clusters may be formed using the collected metadata to establish relationships between actors, directors, titles and other items of the metadata. The affinity clusters may be used to provide recommendations including recommendation to view, record, or set a reminder for programs according to the relationships established by the affinity clusters.

15 Claims, 5 Drawing Sheets

(56) References Cited

U.S. PATENT DOCUMENTS

| | | | |
|---|---|---|---|
| 2005/0160458 A1* | 7/2005 | Baumgartner | 725/46 |
| 2006/0020973 A1* | 1/2006 | Hannum et al. | 725/46 |
| 2006/0026625 A1* | 2/2006 | Krakirian et al. | 725/1 |
| 2006/0026642 A1* | 2/2006 | Schaffer et al. | 725/46 |
| 2006/0156326 A1 | 7/2006 | Goronzy et al. | |
| 2007/0061855 A1* | 3/2007 | Serita et al. | 725/100 |
| 2007/0078849 A1 | 4/2007 | Slothouber | |
| 2008/0187231 A1 | 8/2008 | Barbieri et al. | |
| 2009/0077589 A1* | 3/2009 | Boyer et al. | 725/46 |
| 2009/0083806 A1* | 3/2009 | Barrett et al. | 725/86 |
| 2009/0158307 A1* | 6/2009 | Kashitani | 725/9 |
| 2010/0125869 A1* | 5/2010 | Beyabani | 725/32 |
| 2010/0169926 A1* | 7/2010 | Westberg et al. | 725/40 |
| 2011/0078740 A1* | 3/2011 | Bolyukh et al. | 725/41 |
| 2011/0209185 A1* | 8/2011 | Cho et al. | 725/93 |
| 2011/0239250 A1* | 9/2011 | Krakirian et al. | 725/39 |
| 2012/0102523 A1* | 4/2012 | Herz et al. | 725/34 |

OTHER PUBLICATIONS

Anthony, et al., "Generative Models for Clustering: The Next Generation", Retrieved at <<http://maple.cs.umbc.edu/papers/AAAISprSymAnthony-1.pdf>>, Working Notes of the Spring Symposium on Social Information Processing, AAAI Press, Mar. 2008, pp. 4.

"Foreign Office Action", CN Application No. 201110435764.X, Dec. 4, 2013, 11 Pages.

* cited by examiner

ELECTRONIC PROGRAMMING GUIDE (EPG) AFFINITY CLUSTERS

BACKGROUND

The amount of content available to viewers, such as movies, music, television programs, and videos, is ever-increasing. However, the sheer quantity of choices may leave a viewer feeling there is nothing to watch, even though there are hundreds of television channels and a vast number of programs that may be selected for viewing and/or recording. Therefore, a viewer may only have a limited amount of time to devote to watching television, yet is left to determine and prioritize what to select for viewing from the many choices. For example, viewers may want to quickly find relevant content and may prefer not to waste time searching for something to watch, or watching content that is irrelevant or otherwise not of interest to them.

SUMMARY

Electronic program guide (EPG) affinity clusters are described that may be formed based upon an assumption that programs scheduled in corresponding timeslots are targeted to the same or similar audiences. In at least some embodiments, data for an EPG is examined to identify television programs that are scheduled in timeslots designated as corresponding one to another. Metadata related to the identified programs is collected. The metadata may include titles as well as cast/crew information related to the programs. One or more affinity clusters may be formed using the collected metadata to establish relationships between actors, directors, titles, and other items of the metadata. The affinity clusters may be used to provide recommendations including recommendations to view, record, or set a reminder for programs according to the relationships established by the affinity clusters.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Viewers may want to quickly find relevant content and may prefer not to waste time searching for something to watch, or watch content that is irrelevant or otherwise not of interest to them. The vast amount of content available to viewers, though, may make it time consuming and difficult for viewers to determine and prioritize content that they find most interesting and relevant.

Techniques are described in which electronic program guide (EPG) affinity clusters may be formed based upon an assumption that content scheduled in corresponding timeslots are targeted to the same or similar audiences, e.g., timeslot relating to a particular time on a particular day of the week. For example, data for an EPG may be examined to identify two movies that are scheduled at 8:00 PM on a particular movie channel in different weeks. Thus, the movies may be identified as "matched" programs because they are scheduled in timeslots that correspond to one another. Corresponding timeslots may include slots that reoccur periodically (e.g., daily, weekly, monthly) on the same channel as well as other timeslots that are otherwise linked based upon an assumption and/or knowledge that the timeslots are targeted to the same or similar audiences.

When the two movies are identified as "matched" programs, various metadata related to movies may be collected. The metadata may include the movie titles as well as cast/crew data for the movies. An affinity clusters may be formed using metadata collected for the movies to establish a variety of relationships, such as between actors, directors, titles, and other metadata for the movies. An affinity cluster may be formed by directly placing metadata collected into a cluster. Additionally or alternatively, analysis of multiple matched programs including the two movies may occur to derive affinity values that indicate how frequently particular actors, titles, and directors and other items are matched. These affinity values may be used to selectively determine items to include in affinity clusters. For example, the affinity cluster may include the lead actors for both of the movies, which establishes a relationship between the lead actors.

The affinity clusters that are formed may be used to provide recommendations. For example, a recommendation may be made using the affinity cluster having the lead actors in the above example to recommend movies having one the actors when a user watches a movie including the other actor. A variety of different recommendations are contemplated, such as recommendations to view, record, or set a reminder for programs according to the relationships established by the affinity clusters.

In the discussion that follows, a section titled "Operating Environment" describes but one environment in which various embodiments of EPG affinity cluster techniques may be employed. Next, a section titled "Example EPG Affinity Cluster Techniques" describes example techniques for EPG affinity clusters in accordance with one or more embodiments. Following this, a section titled "Example User Interfaces" describes example interfaces including recommendations in accordance with the example techniques. Last, a section titled "Example System" is provided and describes example systems and devices that may be used to implement one or more embodiments.

Operating Environment

Figure 1:
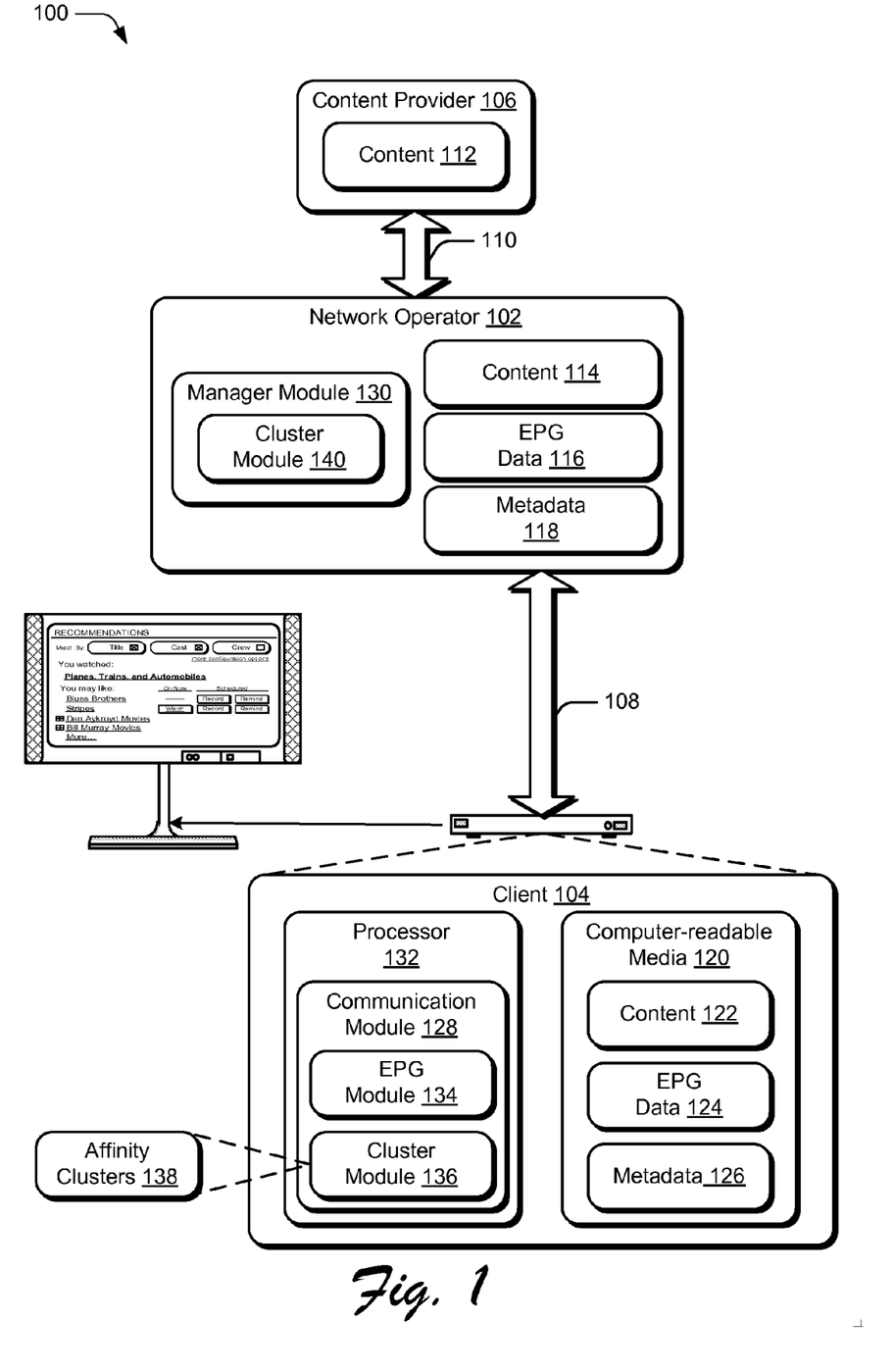
FIG. 1 is an illustration of an example operating environment that is operable to employ techniques for EPG affinity clusters in one or more embodiments.

FIG. 1 is an illustration of an example operating environment 100 that is operable to employ techniques for EPG affinity clusters. The illustrated environment 100 includes a network operator 102 (e.g., a "head end" or "distribution server"), a client 104, and a content provider 106 that are communicatively coupled, one to another, via network connections 108, 110. Although a plurality of network connections 108, 110 are shown separately, the network connections 108, 110 may be representative of network connections achieved using a single network or multiple networks.

The network operator 102, the client 104, and the content provider 106 may each be implemented by way of a computing system including one or more computing devices and having respective processors, memories, storage, and/or other hardware and software components typically associated with various computing systems and devices. One particular example of a computing system is shown and described in relation to FIG. 5 herein. In the following discussion, the network operator 102, the client 104, and the content provider 106 may be representative of one or more entities, and therefore reference may be made to a single entity (e.g., the client 104) or multiple entities (e.g., the clients 104, the plurality of clients 104, and so on).

The client 104 may be configured in a variety of ways. For example, the client 104 may be configured as a computing device that is capable of communicating over the network connection 108, such as a desktop computer, a mobile station, an entertainment appliance, a set-top box communicatively coupled to a display device as illustrated, a wireless phone, and so forth. Thus, the client 104 may range from a full resource device with substantial memory and processor resources (e.g., television-enabled personal computers, television recorders equipped with hard disk) to a low-resource device with limited memory and/or processing resources (e.g., traditional set-top boxes). For purposes of the following discussion, the client 104 may also relate to a person and/or entity that operate the client. In other words, client 104 may describe a logical client that includes a user, software, and/or a machine.

The content provider 106 includes one or more items of content 112 that may be configured in various ways. The content 112 may include a variety of different content including television programs, radio programming, streaming media, video-on-demand (VOD) files, one or more results of remote application processing, and so on. Television programs may include for example movies, sporting events, news broadcasts, pay-per-view programs, television series, regularly scheduled programs, special programs, audio channel programs, and the like.

Content 112 communicated via the network connection 110 can be received by the network operator 102 and stored as one or more items of content 114. The content 114 may be the same as or different from the content 112 received from the content provider 106. The content 114, for instance, may include additional data for broadcast to the client 104. One example of this additional data is illustrated in FIG. 1 as electronic program guide (EPG) data 116. The EPG data 116 may be obtained from an EPG database for broadcast to the client 104, such as through use of a carousel file system. The carousel file system repeatedly broadcasts the EPG data over an out-of-band (OOB) channel to the client 104 over the network connection 108.

Another example of additional data is illustrated in FIG. 1 as metadata 118. Metadata 118 may include a wide variety of data that is used to describe other data, which in this instance is content 114. The metadata 118 may be associated with the content 114 in a variety of ways, such as streamed with the content over the network connection 108. Distribution of the content 114 (and consequently the EPG data 116 and metadata 118 in this example) from the network operator 102 to the client 104 may be accommodated in a number of ways, including cable, radio frequency (RF), microwave, digital subscriber line (DSL), satellite, via Internet Protocol (IP) connection, and so on. Although the EPG data 116 and metadata 118 are illustrated as being provided by the network operator 102 for the sake of simplicity of the figure, it should be readily apparent that the EPG data 116 and/or metadata 118 may originate from a wide variety of sources, such as from one or more stand alone third-party providers.

The client 104, as previously stated, may be configured in a variety of ways to receive the content 114, EPG data 116, and/or metadata 118 over the network connection 108. The client 104 typically includes hardware and software to transport and decrypt content 114 received from the network operator 102 for rendering by the illustrated display device. Although a display device is shown, a variety of other output devices are also contemplated, such as speakers.

The client 104 may also include digital video recorder (DVR) functionality. For instance, the client 104 may include computer-readable media 120 to record content 114 as content 122 received via the network connection 108 for output to and rendering by the display device. The computer-readable media 120 may be configured in a variety of ways, such as a hard disk drive, a removable computer-readable storage medium (e.g., a writable digital video disc), and so on. Computer-readable media may include both "computer-readable storage media" and "communication media," examples of which may be found in the discussion of the example computing system of FIG. 5.

Thus, content 122 that is stored on the computer-readable media 120 of the client 104 may be copies of the content 114 that was streamed from the network operator 102. Additionally, content 122 may be obtained from a variety of other sources, such as from external storage medium that is accessed by the client 104, and so on. The computer-readable media 120 may also be used to store EPG data 116 as EPG data 124 and metadata 118 as metadata 126.

The client 104 includes a communication module 128 that is executable on the client 104 to control content playback on the client 104, such as through the use of one or more "command modes." The command modes may provide non-linear playback of the content 122 (i.e., time shift the playback of the content 122) such as pause, rewind, fast forward, slow motion playback, and the like. For example, during a pause, the client 104 may continue to record the content 114 on the computer-readable media 120 as content 122. The client 104, through execution of the communication module 128, may then playback the content 122 from the computer-readable media 120, starting at the point in time the content 122 was paused, while continuing to record the currently-broadcast content 114 from the network operator 102.

When playback of the content 122 is requested, the communication module 128 is executed on the client 104 to retrieve the content 122. The communication module 128 may also restore the content 122 to the original encoded format as received from the content provider 106. For example, when the content 122 is recorded, the content 122 may be compressed. Therefore, when the communication module 128 retrieves the content 122, the content 122 is decompressed for rendering by the display device.

The network operator 102 is illustrated as including a manager module 130. The manager module 130 is representative of functionality to configure content 114 for output (e.g., streaming) over the network connection 108 to the client 104. The manager module 130, for instance, may configure content 112 received from the content provider 106 to be suitable for transmission over the network connection 108, such as to "packetize" the content for distribution over the Internet, configuration for a particular broadcast channel, and so on.

Thus, in the environment 100 of FIG. 1, the content provider 106 may broadcast the content 112 over a network connection 110 to a multiplicity of network operators, an example of which is illustrated as network operator 102. The network operator 102 may then stream the content 114 over a network connection to a multitude of clients, an example of which is illustrated as client 104. The client 104 may then store the content 114 as content 122, such as when the client 104 is configured to include digital video recorder (DVR) functionality.

The content 114 may also be representative of video-on-demand (VOD) content that is streamed to the client 104 when requested, such as movies, sporting events, and so on. For example, the network operator 102 may execute the manager module 130 to provide a VOD system such that the content provider 106 supplies content 112 in the form of complete content files to the network operator 102. The network operator 102 may then store the content 112 as content 114. The client 104 may then request playback of desired content 114 by contacting the network operator 102 (e.g., a VOD server) and requesting a feed of the desired content.

In another example, the content 114 may further be representative of content that was recorded by the network operator 102 in response to a request from the client 104, in what may be referred to as a network DVR example. Like VOD, the recorded content 114 may then be streamed to the client 104 when requested. Interaction with the content 114 by the client 104 may be similar to interaction that may be performed when the content 122 is stored locally on the computer-readable media 120.

The client 104, for instance, may execute the communication module 128 to initiate control functions for interacting with the content 122. For example, the control functions may include control functions to time-shift output of the content 122 as well as channel selection, electronic program guide (EPG) navigation, purchase of on-demand content, and so on. In another implementation, the communication module 128 provides media player functionality to play media having audio and/or visual data, such as a satellite radio having storage to record songs and/or music videos locally on the client 104. The communication module 128 may be utilized to time-shift an output of content (e.g., audio-visual content) from a variety of different sources, such as the locally stored content 122 and/or the remotely stored content 114.

The client 104 is illustrated as executing the communication module 128 on a processor 132. The communication module 128 may also include or otherwise make use of an EPG module 134 which is representative of functionality that may be employed to generate and manage an EPG from the EPG data 124. For instance, the EPG module 134 may receive EPG data 116 from the network operator 102 (e.g., directly and/or from computer-readable media 120 as EPG data 124) and process the data to create and output an EPG, an example of which is illustrated in FIG. 1 as being output on the display device.

The communication module 128 may also include or otherwise make use of a cluster module 136 which is representative of functionality that may be employed to form and/or utilize affinity clusters 138. Affinity clusters 138 for example may be formed using EPG data 124 for content 122 and metadata 126 corresponding to the content 122. In at least some embodiments, affinity clusters 138 are formed that relate items of content 122 (e.g., television programs) and/or items described by metadata 126 one to another when the items are scheduled for corresponding timeslots according to the EPG data 124. This may include forming relationships between program titles, cast members, and/or crew members based upon scheduling of programs in corresponding timeslots. In this case, the fact that television programs are scheduled in corresponding timeslots is used to make an assumption that the programs were targeted to similar audiences (e.g., shared audience targeting criteria) that are likely to enjoy similar programs. Corresponding timeslots may include timeslots that are considered the same and/or timeslots that are otherwise "linked" one to another due to shared audience targeting criteria. Programs scheduled in corresponding timeslots may be referred to herein as "matched" programs.

Accordingly, a cluster module 136 deployed to a client 104 may operate to identify programs in corresponding timeslots through EPG data 124, form affinity clusters 138 using metadata 126, and employ the affinity clusters 138 in various ways, including outputting recommendations. Further discussion regarding affinity clusters 138 may be found in relation to the following example procedures and user interfaces.

It should be noted that one or more of the entities shown in FIG. 1 may be further divided (e.g., the network operator 102 may be implemented by a plurality of servers in a distributed computing system), combined (e.g., the network operator 102 may incorporate a cluster module 140 or other functionality on the "server-side" to form affinity clusters 138 and recommendations alone and/or in conjunction with a cluster module 136 of a client 104 on the "client-side"), and so on. Thus, the environment 100 of FIG. 1 is illustrative of one of a plurality of different environments that may employ the described techniques.

Having considered an example operating environment, example techniques are described as follows that may be employed in one or more embodiments of EPG affinity clusters.

Example EPG Affinity Cluster Techniques

The following discussion describes example techniques for EPG affinity clusters that may be implemented utilizing the previously described environment, systems, and devices. Aspects of the techniques for EPG affinity clusters described herein may be implemented in hardware, firmware, or software, or a combination thereof. In portions of the following discussion, reference may be made to the example operating environment 100 of FIG. 1.

Figure 2:
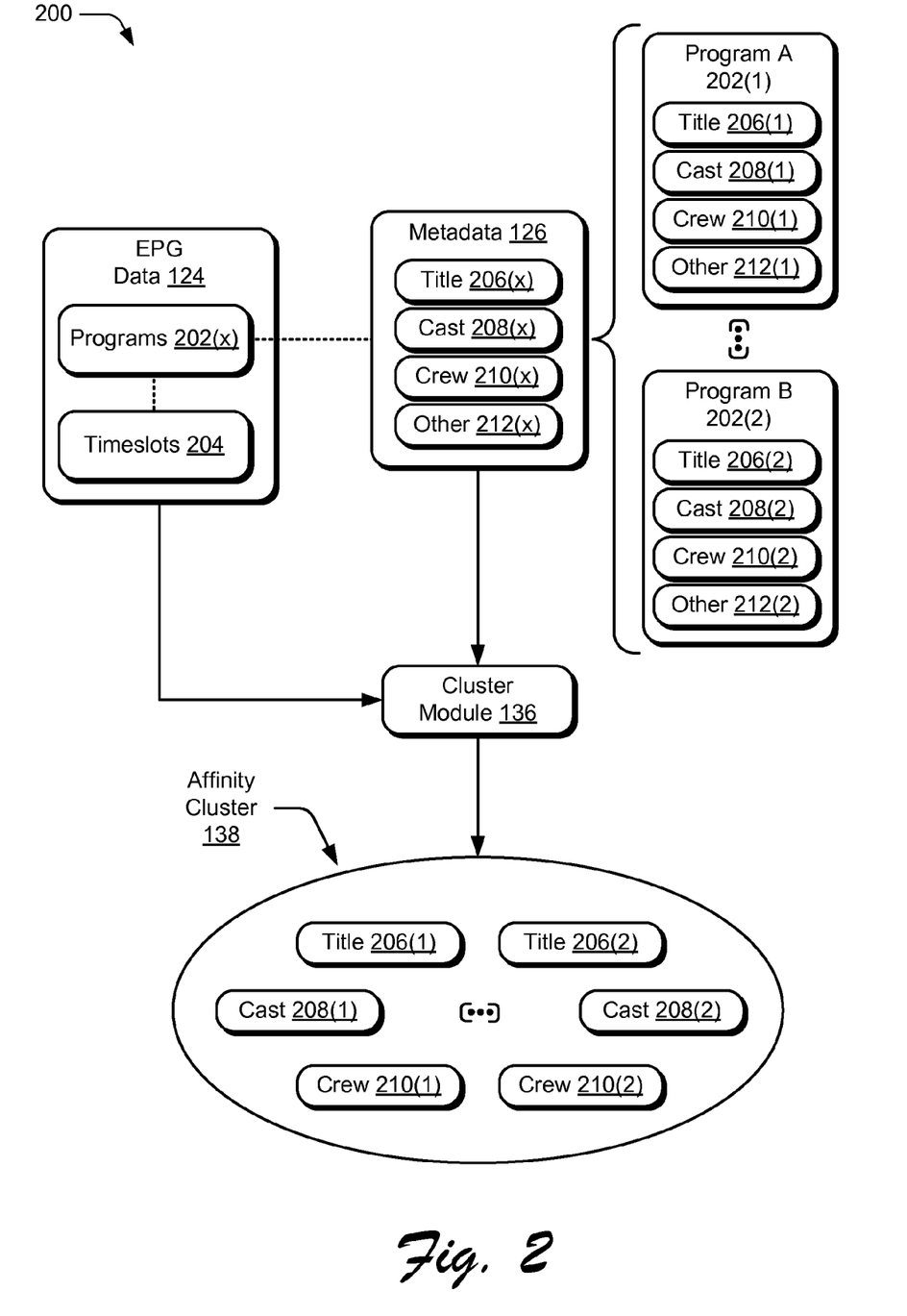
FIG. 2 is an illustration of an example scenario for formation of an affinity cluster in accordance with one or more embodiments.

Consider now FIG. 2, which depicts generally at 200 an example scenario in which a cluster module 136 operates to form an affinity cluster 138. Techniques described herein in relation to a cluster module 136 deployed to a client 104 may generally be implemented by the client 104 alone, by a cluster module 140 deployed to a network operator 102 alone, and/or in a distributed manner between the client 104 and the network operator 102 as previously described in relation to FIG. 1.

As depicted in FIG. 2, EPG data 124 may include data describing various programs 202(x), where "x" can be any integer from 1 to "X," and timeslots 204 for which the programs 202(x) are scheduled. In other words, the EPG data 124 describes a program guide that indicates the times, days, channels on which programs 202(x) are scheduled for broadcast, and so on. In this context, a timeslot may relate to a particular time of day and a day of the week. A timeslot 204 may also relate to a particular channel. Additionally or alternatively, a timeslot 204 may relate to a part of the day such as morning, afternoon, and evening rather than a set time of day. The timeslots 204 may include various durations, such as timeslots for half-hour and hour long programs as well as longer timeslots for movies, sports events, special programs, and so forth.

As noted, affinity clusters 138 may be formed based upon timeslots 204 that correspond to one another. Timeslots may correspond to one another in a variety of ways. Corresponding timeslots may include timeslots that are considered the "same" and/or timeslots that are otherwise "linked" one to another due to shared audience targeting criteria. In one example, programs that are scheduled for the same time of day, day of week, and channel, but in different periods (e.g., different weeks or months) are considered to have corresponding (e.g., matching) timeslots. As noted, a part of the day (e.g., morning, afternoon, evening) may also be used to define corresponding timeslots 204 in place of a time of day.

In another example, timeslots 204 that correspond may be defined to include those that share the same time of day and day of week on different channels. In this example, the different channels may have a pre-established relationship that is used to assume or determine that the channels have similar audience targeting criteria. For instance, the different channels may each be sports networks, movie channels, or news networks. Additionally, timeslots 204 that correspond may be defined to include those that share the same time of day and channel, but on different days of the week. For instance, a variety channel may show similar movies at 8:00 PM on Monday through Thursday and therefore, these timeslots 204 may be defined as corresponding.

Corresponding timeslots may further include those that are otherwise "linked" one to another due to shared audience targeting criteria. For example, a 8:00 PM Thursday timeslot and a 3:00 PM Saturday timeslot on a comedy channel may be linked because movies are shown at both of these times that are targeted to male viewers between the ages of 18 to 35. Likewise, a weekday afternoon timeslot and a Saturday morning timeslot on a children's channel may be linked because programs are shown at both of these times that are targeted to teens. Thus, timeslots may be defined as corresponding in a variety of ways.

Additionally, programs 202(x) may be associated with metadata 126 that includes different items of information regarding the programs. For example, metadata 126 associated with the programs 202(x) as illustrated in FIG. 2 may include at least titles 206(x), cast 208(x) data regarding actors/actresses in the programs, and crew 210(x) data regarding producers, directors, writers, production company, and so on. Metadata 126 associated with the programs 202(x) may also include other 212(x) data such as content categories, program ratings, program length, descriptions, and viewer ratings, to name a few examples.

Affinity clusters 138 may be formed to establish relationships within one or more of these above-noted items of metadata 126. For example, at least some of titles 206(x), cast 208(x) data, and/or crew 210(x) data for two programs 202(x) that are determined to have corresponding timeslots 204 may be placed into an affinity cluster 138. In the particular example depicted in FIG. 2, a cluster module 136 may operate to analyze EPG data 124 to identify that program A 202(1) and program B 202(2) are scheduled in corresponding timeslots 204. An affinity cluster 138 may therefore be formed by the cluster module 136 that includes selected metadata 126 associated with program A 202(1) and program B 202(2). Program A 202(1) and program B 202(2) are depicted as each being associated with respective items 206(1)-212(1) and 206(2)-212(2) of metadata 126 that may be used to form an affinity cluster 138. Further details regarding formation of affinity clusters may be found in the discussion of the following example procedure.

Figure 3:
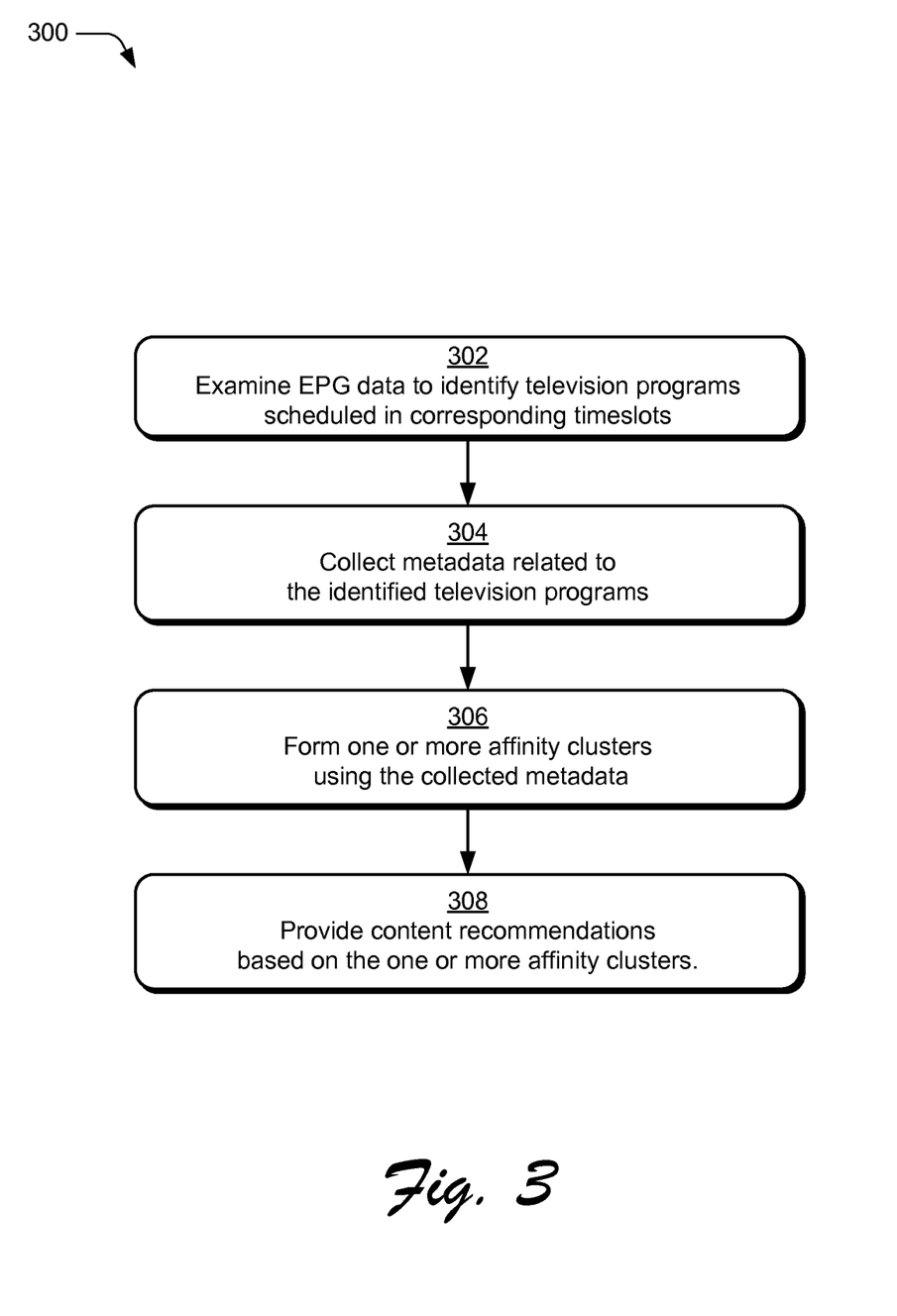
FIG. 3 is a flow diagram depicting an example procedure in accordance with one or more embodiments.

In particular, FIG. 3 depicts an example procedure 300 in which an affinity cluster is formed in accordance with one or more embodiments. In at least some embodiments, the procedure 300 may be performed by a suitably configured computing system, such as a network operator 102 and/or client 104 of FIG. 1, or other computing system having one or more cluster modules 136, 140. The procedure is shown as a set of blocks that specify operations performed by one or more devices and are not necessarily limited to the orders shown for performing the operations by the respective blocks. In portions of the following discussion, reference may be made to the environment 100 of FIG. 1 and the example of FIG. 2, respectively.

EPG data is examined to identify television programs scheduled in corresponding timeslots (block 302). Consider again program A 202(1) and program B 202(2) in the example of FIG. 2. Assume now that these programs are movies that appear on a movie channel. For example, program A 202(1) may be a movie "Planes, Trains, and Automobiles" and program B 202(2) may be a movie "Blue Brothers." The movie channel may schedule these movies in an 8:00 PM timeslot on Thursday night to target male viewers that are age 18-35. More particularly, the movie channel may schedule different comedies in this timeslot weekly that the target male viewers are likely to enjoy.

The techniques for EPG affinity clusters described herein do not rely directly upon specific targeting criteria for programs as just described. Instead, the knowledge that content providers 106 are likely targeting programs to similar target audiences in corresponding timeslots (e.g., timeslots that are the same or linked as discussed previously) may be used to more effectively and efficiently form affinity clusters 138. Rather than having to obtain and use specific targeting criteria for each program and/or timeslot from content providers 106, a cluster module 136 in accordance with the described techniques may be configured based on an assumption that timeslots defined as corresponding to one another are targeted to similar target audiences.

In this context, a cluster module 136 may operate to examine EPG data 124 and identify programs that are scheduled in corresponding timeslots. The cluster module 136 may include or otherwise make use of a timeslot list, database, or other data source configured to provide data defining corresponding timeslots. The examination of EPG data 124 may occur automatically according to pre-determined schedule and/or on demand in response to a viewer request.

Here, the cluster module 136 may examine EPG data 124 and identify that "Planes, Trains, and Automobiles" and "Blue Brothers", e.g., program A 202(1) and program B 202(2), are scheduled for the 8:00 PM Thursday timeslot on the movie channel in different weeks.

Metadata is collected that is related to the identified television programs (block 304). In the preceding example, the cluster module 136 may collect various metadata 126 that is associated with the movies "Planes, Trains, and Automobiles" and "Blue Brothers." The cluster module 136 may be implemented to collect various configurable combinations of metadata 126 to form affinity clusters 138. The combinations collected may include titles 206(x), selected cast members from cast 208(x) data, and/or selected members of the crew from crew 210(x) data. Other 212(x) data may also be designated for collection in at least some embodiments.

The particular metadata 126 that is collected determines the affinity relationships that are created by a corresponding affinity cluster 138. In one example, a viewer may be provided an option via the communication module 132 to select the items of metadata 126 to collect for inclusion in affinity clusters 138. For example, one viewer may make a selection to include lead actors/actresses and directors in clusters, while another viewer chooses to include titles and writers. Additionally or alternatively, the cluster module 136 may include or make use of a default combination of metadata 126 designated for collection. For instance, a cluster module 136 may be set by default to include titles, lead actors/actresses, and directors in the combination of metadata 126 that is collected. Naturally, any suitable combination of metadata 126 may be designated for collection by default and/or through user selectable options.

One or more affinity clusters are formed using the collected metadata (block 306). For instance, cluster module 136 may be configured to form clusters in various ways using metadata 126 that is collected based upon EPG data 124 as just described.

In one approach, an affinity cluster 138 may be formed for one or more corresponding timeslots that includes the particular items of metadata 126 that are designated for collection. This may involve directly placing collected metadata 126 into appropriate clusters. For the above example, if titles and lead actors are designated, then the titles "Planes, Trains, and Automobiles", "Blue Brothers" and corresponding actors "Steve Martin", "Dan Aykroyd" may be directly placed into a cluster.

Additionally or alternatively, collected metadata 126 for a number of matched programs (e.g., programs scheduled for corresponding timeslots) as determined using the EPG data 124 may be further analyzed together in various ways to ascertain affinity relationships expressed by affinity values between titles, cast, crew and/or other designated metadata 126. In general, analysis may be performed to determine and assign affinity values that express how frequently cast/crew and/or titles are matched in corresponding timeslots 202(x). Clusters may be formed at least in part based upon affinity values that are assigned. Considering a number of matched programs together in this way may facilitate creating highly relevant affinity clusters 138 by taking into account matches of collected metadata 126 that may occur across may different channels, timeslots, and so forth. Naturally, items of metadata 126 that are found to match more frequently are good candidates for inclusion together in particular affinity clusters 138.

By way of example and not limitation, affinity values may be determined based upon dissimilarity matrices constructed for the cast/crew and/or titles using the collected metadata 126. To illustrate this approach, consider the following simplified example of clustering for a group of actors. For this example, assume that there are six actors described by the metadata 126 associated with EPG data 124. Here, the analysis may occur across two channels and using parts of a day instead of using exact times from the program schedule. The subject channels/timeslots represented in the example may have been previously determined to correspond one to another as discussed herein.

A binary (e.g., Boolean) value may be used to represent whether a particular actor is "scheduled" at a particular channel and daypart. A matrix may be constructed to represent the scheduling of actors for particular channels and dayparts, such as the following example actor schedule matrix in Table 1:

TABLE 1

Example Actor Schedule Matrix

| | Channel 1 Morning | Channel 1 Afternoon | Channel 1 Evening | Channel 2 Morning | Channel 2 Afternoon | Channel 2 Evening |
|---|---|---|---|---|---|---|
| Actor 1 | 1 | 0 | 1 | 0 | 0 | 0 |
| Actor 2 | 1 | 0 | 0 | 0 | 1 | 0 |
| Actor 3 | 0 | 0 | 0 | 1 | 0 | 0 |
| Actor 4 | 0 | 0 | 0 | 1 | 0 | 0 |

TABLE 1-continued

Example Actor Schedule Matrix

| | Channel 1 Morning | Channel 1 Afternoon | Channel 1 Evening | Channel 2 Morning | Channel 2 Afternoon | Channel 2 Evening |
|---|---|---|---|---|---|---|
| Actor 5 | 0 | 1 | 1 | 1 | 0 | 0 |
| Actor 6 | 1 | 1 | 0 | 0 | 1 | 1 |

Given the above matrix, a distance algorithm for binary matrices may be applied to calculate the "distance" between the different actors, which may be expressed as a distance matrix. Based on application of the distance algorithm to the example actor schedule matrix, the following example actor distance matrix in Table 1 is produced:

TABLE 2

Example Actor Distance Matrix

| | Actor 1 | Actor 2 | Actor 3 | Actor 4 | Actor 5 | Actor 6 |
|---|---|---|---|---|---|---|
| Actor 1 | 1 | | | | | |
| Actor 2 | 0.333 | 1 | | | | |
| Actor 3 | 0.5 | 0.5 | 1 | | | |
| Actor 4 | 0.5 | 0.5 | 0 | 1 | | |
| Actor 5 | 0.5 | 0.833 | 0.333 | 0.333 | 1 | |
| Actor 6 | 0.667 | 0.333 | 0.8333 | 0.8333 | 0.8333 | 1 |

The above example actor distance matrix shows values that may correspond to affinity values between the six actors. In this case, a lower value for a pair of actors in the distance matrix indicates that the pair of actors is "closer," e.g., the pair of actors is scheduled/matched in corresponding timeslots more frequently. Affinity values may be taken directly as those in the distance matrix and/or may be derived from the distance matrix using a conversion. For example, affinity values may be computed by subtracting the distance values from one so that a higher affinity value indicates that the pair of actors is scheduled in corresponding timeslots more frequently. Based on this conversion, the following example affinity values in Table 3 are derived.

TABLE 3

Example Affinity Values

| | Actor 1 | Actor 2 | Actor 3 | Actor 4 | Actor 5 | Actor 6 |
|---|---|---|---|---|---|---|
| Actor 1 | 0 | | | | | |
| Actor 2 | 0.667 | 0 | | | | |
| Actor 3 | 0.5 | 0.5 | 0 | | | |
| Actor 4 | 0.5 | 0.5 | 1 | 0 | | |
| Actor 5 | 0.5 | 0.167 | 0.667 | 0.667 | 0 | |
| Actor 6 | 0.333 | 0.667 | 0.167 | 0.167 | 0.167 | 0 |

The affinity values that are determined using any suitable technique may be used as basis for forming affinity clusters 138. One way this may occur is by setting a configurable affinity threshold for the affinity values that controls whether actors and other items of metadata 126 are placed into a cluster. A comparison may be made to determine whether individual affinity values satisfy the threshold. For example, if the affinity threshold is set at 0.6, then items having an affinity value that satisfies the threshold may be selected for clusters. Assuming that affinity values are configured with higher values indicating closer items as in Table 3, then the threshold of 0.6 is satisfied by actors 1 and 2, 2 and 6, 3 and 5, 3 and 4, and 4 and 5. Thus, clusters that are formed in this example may include one cluster having actors 1, 2, and 6 and another cluster having actors 3, 4, and 5 based upon the affinity values that are computed.

A variety of clustering algorithms are contemplated that may be employed to isolate clusters using EPG data 124 and corresponding metadata 126. In general, suitable algorithms may be configured to compute some type of affinity values that express how frequently items of metadata 126 (e.g., title, cast, crew) are matched and apply a threshold or other selection technique to select items to place in clusters based upon the computed affinity values. Accordingly, affinity clusters 138 to establish relationships within one or more categories of metadata 126 may be formed using EPG data 124 to compute affinity values associated with particular items of metadata 126

Recommendations are provided based on the one or more affinity clusters (block 308). For instance, a client 104 may be configured to use relationships defined by affinity clusters 138 to generate and/or output one or more corresponding recommendations. In at least some embodiments, recommendations may be provided through a EPG user interface that is output via an EPG module 134. This may include making suggestions to view a program, set a program reminder, record a program, and so forth. The client 104 may even be configured to automatically set a recording and/or tune to a program that is recommended using affinity clusters 138. The automatic recording/tuning may be configured to occur by default and/or a viewer may be able to selectively toggle an automatic recording/tuning option "on" or "off" through selectable options output through an EPG user interface. The recommendations may also take into account a viewing history for a viewer.

In the preceding example, for instance, when a viewer watches "Planes, Trains, and Automobiles" a recommendation to watch/record "Blues Brothers" may be configured based upon the titles being associated by an affinity cluster 138. Further, a recommendation may be made for various movies with "Dan Aykroyd" since "Steve Martin" in "Planes, Trains, and Automobiles" is associated with "Dan Aykroyd" in the affinity cluster 138. Other recommendations for cast/crew, titles and/or other items of metadata 126 may be configured according to affinity clusters 138 in a comparable way. Additional details regarding recommendations configured based on affinity clusters 138 may be found in relation to the following discussion of an example user interface.

Having considered an example procedure a discussion of an example user interface follows that can be employed to provide recommendations in one or more embodiments of EPG affinity clusters.

Example User Interfaces

The following discussion describes example user interfaces that may be output by the previously described example environment, as well as other environments. Thus, although portions of the following discussion refer to the environment 100 of FIG. 1, the following discussion should not necessarily be limited to that environment 100.

Figure 4:
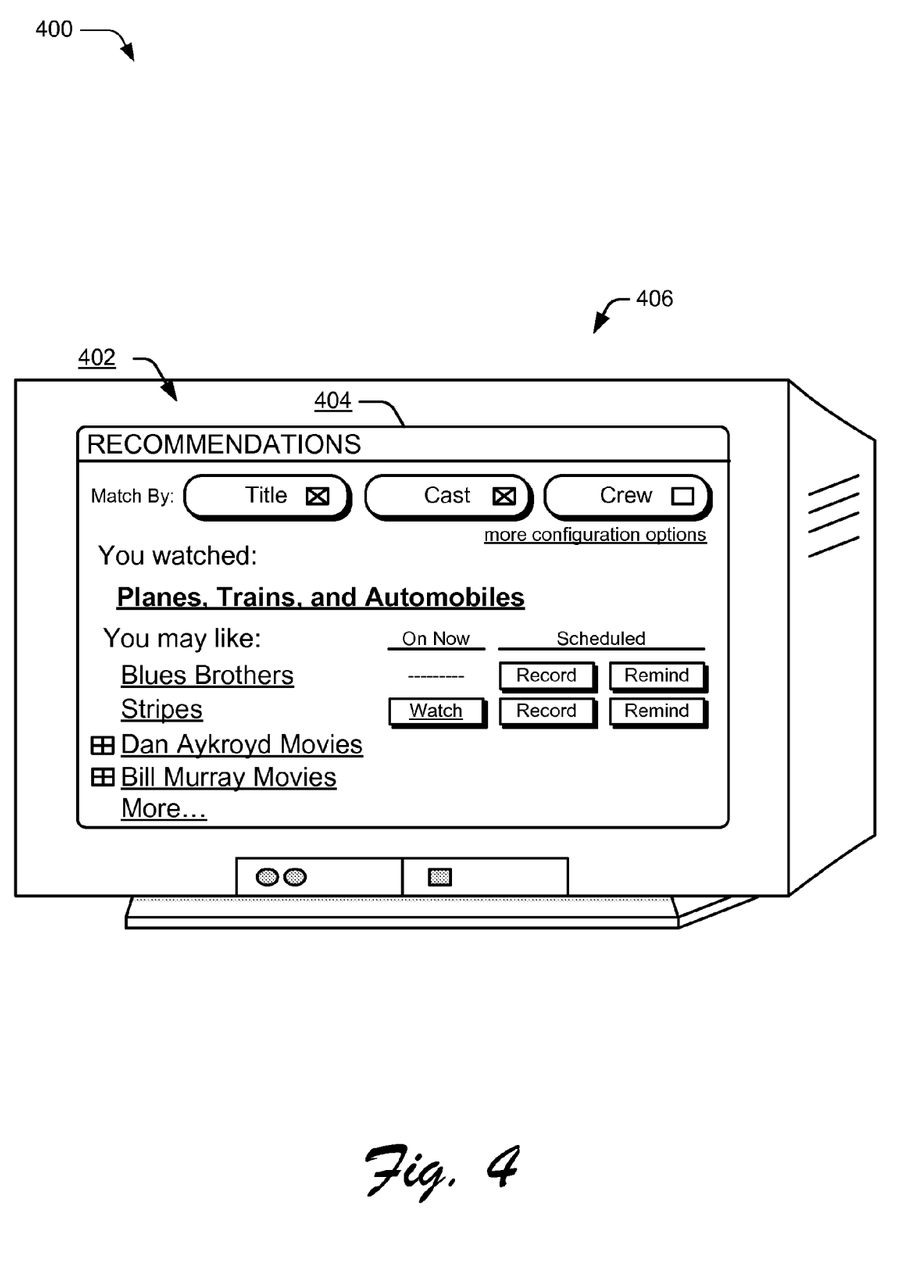
FIG. 4 is a diagram depicting an example user interface having a recommendation in accordance with one or more embodiments.

FIG. 4 depicts an embodiment 400 of an example electronic program guide (EPG) 402 user interface as being output and displayed at a client 104, such as via a communication module 128. The EPG 402 may incorporate a recommendation 404 that is configured based upon affinity clusters 138 formed as discussed herein. The recommendation 404 may be configured in a variety of ways. For instance, the recommendation 404 may be provided via a webpage as shown, a pop-up window that appears over a guide portion of the EPG, an alert icon, prompt, or message box that appears during presentation of a program 202(x), or other suitable user interface component.

The recommendation 404 may indicate one or more programs 202(x) that a viewer may enjoy based on other programs with which the viewer has interacted (e.g., viewed, recorded, or otherwise selected) as indicated by a content history associated with the viewer. The recommendation 404 may similarly include cast/crew recommendations. At least some of these recommended programs 202(x) and cast/crew items may be determined using affinity clusters 138 formed as discussed herein. Here for instance, the example recommendation 404 indicates that the viewer may like the programs "Blue Brothers" and "Stripes," which are related using the techniques described herein to a program "Plane, Trains, and Automobiles" that the viewer has watched. The example recommendation 404 additionally includes actor recommendations for "Dan Aykroyd" and "Bill Murray" that appear as expandable portions in the recommendation 404.

A recommendation 404 may also include various selectable controls to enable interaction with recommended items. For instance, the example recommendation is configured with a selectable button that enables a viewer to select to watch a recommended program instantly if the program is appearing now. Selection of the button may cause the client to tune to a channel on which the corresponding program is appearing. Similarly, selectable buttons may be included that are selectable to cause a program that is scheduled at a future time to be automatically recorded and/or to set a reminder for the scheduled program.

The EPG 402 may also provide various configuration options for recommendations through a configuration page accessible through the EPG and/or directly via a recommendation 404. Among other things, configuration options may be provided that enable a viewer to selectively designate items of metadata 126 to collect, set an affinity threshold for affinity values, make selections to set or change designations to define timeslots 202(x) as corresponding, set whether to use scheduled times and/or parts of a day for affinity clusters 138, add or remove items from particular clusters, and so forth. The configuration options may also enable a viewer to selectively toggle the types of recommendations that appear in a recommendation 404. For instance, the example recommendation 404 of FIG. 4 provides a viewer the ability to select whether to include titles, cast, and/or crew relationships when making recommendations. In this case, title and cast options are selected and the crew option is deselected. Accordingly, title and cast recommendations are displayed, but crew recommendations are not displayed. Changing the options may cause a corresponding change in the types of recommendations that are displayed. Additional configuration options, including the examples mentioned above, may be accessible through a selectable control, such as the selectable link to more configuration options that is included in the example recommendation 404.

Thus a user interface may be configured in various ways to provide recommendations that are based at least in part upon affinity clusters 138 formed in the manner discussed herein. Having considered some examples of such a user interface and recommendations, consider now a discussion of an example system that may be employed to implement aspects of EPG affinity clusters in one or more embodiments.

Example System

Figure 5:
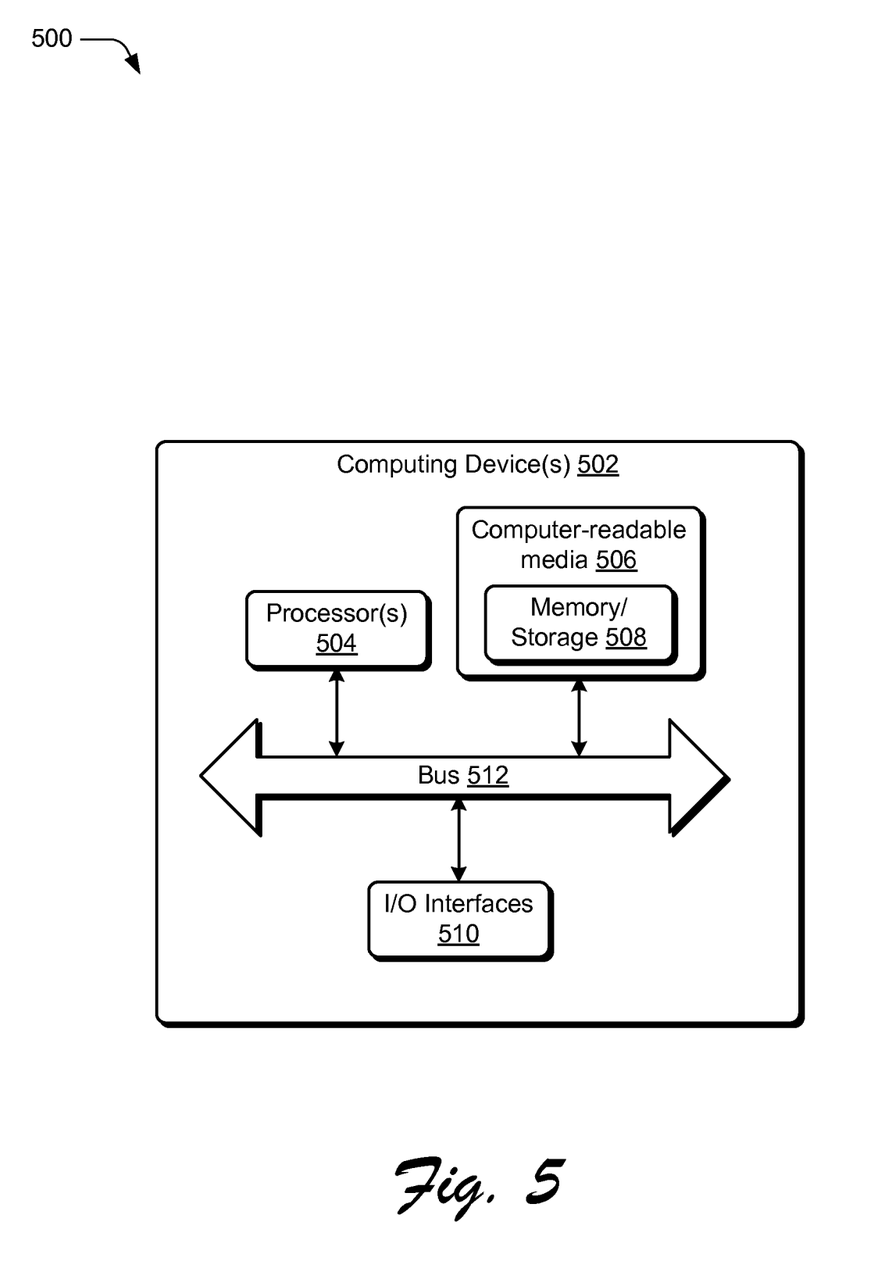
FIG. 5 is an illustration of an example system that can be used to implement one or more embodiments.

FIG. 5 illustrates an example system generally at 500 that includes an example computing device 502 that is representative of one or more such computing systems and/or devices that may implement the various embodiments described above. The computing device 502 may be, for example, a server of a network operator 102, a device associated with the client 104 (e.g., a client device), an on-chip system, and/or any other suitable computing device or computing system.

The example computing device 502 includes one or more processors 504 or processing units, one or more computer-readable media 506 which may include one or more memory and/or storage components 508, one or more input/output (I/O) interfaces 510 for input/output (I/O) devices, and a bus 512 that allows the various components and devices to communicate one to another. Computer-readable media 506 and/or one or more I/O devices may be included as part of, or alternatively may be coupled to, the computing device 502. The bus 512 represents one or more of several types of bus structures, including a memory bus or memory controller, a peripheral bus, an accelerated graphics port, and a processor or local bus using any of a variety of bus architectures. The bus 512 may include wired and/or wireless buses.

The one or more processors 504 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 508 represents memory/storage capacity associated with one or more computer-readable media. The memory/storage component 508 may include volatile media (such as random access memory (RAM)) and/or nonvolatile media (such as read only memory (ROM), Flash memory, optical disks, magnetic disks, and so forth). The memory/storage component 508 may include fixed media (e.g., RAM, ROM, a fixed hard drive, etc.) as well as removable media (e.g., a Flash memory drive, a removable hard drive, an optical disk, and so forth).

Input/output interface(s) 510 allow a user to enter commands and information to computing device 502, and also allow information to be presented to the user and/or other components or devices using various input/output devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software, hardware (fixed logic circuitry), or program modules. Generally, such modules include routines, programs, objects, elements, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. Computer-readable storage media also includes hardware elements having instructions, modules, and/or fixed device logic implemented in a hardware form that may be employed in some embodiments to implement aspects of the described techniques.

The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, hardware elements (e.g., fixed logic) of an integrated circuit or chip, or other storage device, tangible media, or article of manufacture suitable to store the desired information and which may be accessed by a computer.

"Communication media" may refer to a signal bearing medium that is configured to transmit instructions to the hardware of the computing device, such as via the network 108. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Combinations of any of the above are also included within the scope of computer-readable media. Accordingly, software, hardware, or program modules, including the cluster module 136, cluster module 140, communication module 128, EPG module 134, manager module 130, and other program modules, may be implemented as one or more instructions and/or logic embodied on some form of computer-readable media.

Accordingly, particular modules, functionality, components, and techniques described herein may be implemented in software, hardware, firmware and/or combinations thereof. The computing device 502 may be configured to implement particular instructions and/or functions corresponding to the software and/or hardware modules implemented on computer-readable media. The instructions and/or functions may be executable/operable by one or more articles of manufacture (for example, one or more computing devices 502 and/or processors 504) to implement techniques for EPG affinity clusters, as well as other techniques. Such techniques include, but are not limited to, the example procedures described herein. Thus, computer-readable media may be configured to store or otherwise provide instructions that, when executed by one or more devices described herein, cause various techniques for EPG affinity clusters.

Conclusion

Although aspects of EPG affinity clusters have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. A method comprising:
    examining electronic programming guide (EPG) data to identify television programs scheduled in corresponding timeslots;

collecting metadata related to the identified television programs, the metadata including data regarding one or more cast members;

comparing metadata of a first identified television program with metadata of a second identified television program;

constructing a matrix based, at least in part, on the compared metadata to represent a scheduling of a particular cast member of the first identified television program and a particular cast member of the second identified television program;

applying a conversion to one or more values included in the matrix;

responsive to applying the conversion, determining affinity values to represent a frequency that the particular cast member of the first identified television program matches the particular cast member of the second identified television program; and forming one or more affinity clusters based, at least in part, on the determined affinity values, the formed one or more affinity clusters including at least some of the collected metadata of the first identified television program and at least some of the collected metadata of the second identified television program.

2. A method as described in claim 1, wherein the one or more affinity clusters are configured to establish relationships between items of the metadata that are placed into the one or more affinity clusters.

3. A method as described in claim 1, wherein the collected metadata further including data regarding crew members associated with the first and the second identified television programs and the affinity clusters are formed to establish relationships between at least some of the crew members.

4. A method as described in claim 1, wherein the corresponding timeslots include timeslots on a particular channel at a particular time in different weeks.

5. A method as described in claim 1, wherein the corresponding timeslots include timeslots on a particular channel at a particular time on different days of the week.

6. A method as described in claim 1, wherein the corresponding timeslots include timeslots on different channels at a particular time on a particular day of the week.

7. A method as described in claim 1, wherein the corresponding timeslots include linked timeslots that are linked as corresponding based upon shared audience targeting criteria.

8. A method as described in claim 1, wherein forming one or more affinity clusters using the collected metadata comprises:

ascertaining affinity values indicative of how frequently items of the collected metadata are matched in corresponding timeslots; and selecting items of the collected metadata to include in the one or more affinity clusters based upon the affinity values.

9. A method as described in claim 1, further comprising:

comparing the affinity values to an affinity threshold configured to control which items of the collected metadata are placed into the one or more affinity clusters.

10. A method as described in claim 1, further comprising outputting a recommendation based upon the one or more affinity clusters.

11. A non-transitory computer-readable medium having instructions recorded thereon for outputting a recommendation, the instructions comprising:

instructions for examining electronic programming guide (EPG) data to identify television programs scheduled in corresponding timeslots on a particular channel at a particular time in a different week or a different month;

instructions for computing affinity values to represent a frequency that a particular cast member of the first identified television program matches a particular cast member of the second identified television program;

instructions for selecting one or more cast members to include in an affinity cluster according to the computed affinity values;

instructions for configuring an affinity cluster to relate metadata describing at least cast members associated with the first and second identified television programs, one to another, based upon scheduling of the first and second identified television programs in the corresponding timeslots and the computed affinity values; and instructions for outputting a recommendation according to the affinity cluster to recommend programs associated with at least some of the metadata related by the affinity cluster.

12. The non-transitory computer-readable medium of claim 11, further comprising:

instructions for collecting the metadata associated with the first and second identified television programs responsive to a determination that the television programs are scheduled in the corresponding timeslots;

instructions for placing the collected metadata in the affinity cluster to create relationships between the cast members of the first and second identified television programs one to another; and instructions for using the relationships between the cast members to generate the recommendation.

13. The non-transitory computer-readable medium of claim 11, further comprising:

instructions for collecting the metadata associated with the first and second identified television programs responsive to a determination that the television programs are scheduled in the corresponding timeslots.

14. The non-transitory computer-readable medium of claim 11, instructions for automatically and without user input recording at least one of the programs recommended based on the affinity cluster.

15. The non-transitory computer-readable medium of claim 11, further comprising instructions for automatically tuning to at least one of the programs recommended based on the affinity cluster at a scheduled time for the a least one program.

* * * * *